Feb. 13, 1968  R. C. SELIX  3,368,564
TUBE ANCHOR AND GUIDE DEVICE
Filed Feb. 18, 1965
Fig.1
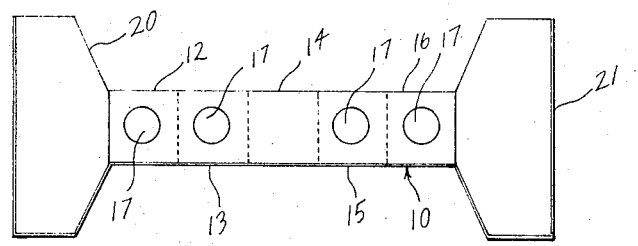
Fig.2
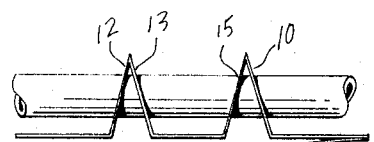
Fig.3
Fig.4
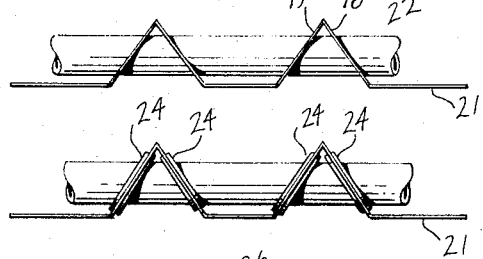
Fig.5
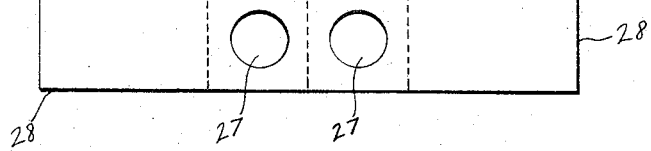
Fig.6
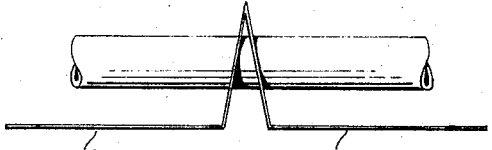
Fig.7
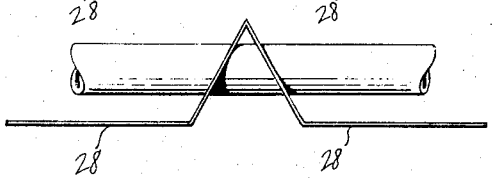
INVENTOR.
RICHARD C. SELIX
BY Warren T. Jessup
ATTORNEY

United States Patent Office 3,368,564
Patented Feb. 13, 1968

3,368,564
TUBE ANCHOR AND GUIDE DEVICE
Richard C. Selix, 1549 N. Gordon Ave.,
Hollywood, Calif. 90028
Filed Feb. 18, 1965, Ser. No. 433,713
5 Claims. (Cl. 128—348)

ABSTRACT OF THE DISCLOSURE

An anchor and guide for medical tubing, which is adhesively secured to a support surface adjacent the patient, or to his person, and is composed of panels hinged together so as to be selectively positioned in any desired angular relationship, whereby openings in the panels will allow tubing to slide if the panels are erect, but will bind the tubing if the angular relationship is increased. Medical tubing is therefore selectively bound in place, or allowed to glide in a selected path.

---

This invention relates generally to anchoring devices and more particularly to a device for anchoring small gauge, light weight tubing, especially that which is considered medical tubing. This tubing includes naso-gastric tubes, oxygen therapy tubing, drainage tubes, and the various catheters.

Because these tubes either arise from the patient, or terminate therein, and are connected to some other source such as a suction machine, oxygen supply, or drainage bottle, it is essential to proper tube function, patient safety and comfort, to secure or channel these tubes, depending upon the particular therapy employed.

At the present time, the common method of anchoring these tubes is to apply strips of adhesive tape over the tubing, anchoring it to the patient or to the bed proper. This method, while generally used, is not completely satisfactory for several reasons which will be shown. Foremost however, is the inability of this method to allow for a channeling of the tubes, to guide the tubes, but leaving them free to movement. This prior art method merely anchors the tubing, making it fast.

It is therefore an object of this invention to provide a new and novel anchoring device which is especially adapted to anchor medical tubing.

A further object is to provide such an anchor which will secure the tubing, or guide it for longitudinal movement in a fixed path, as the therapy dictates.

A further object is to provide such an anchor which may be applied to any type or shaped surface, and which may be re-applied readily when repositioning of the tubes becomes necessary.

A further object is to provide such an anchor which is neat in appearance, inexpensive to manufacture, and which may be discarded after one use.

A still further object is to provide such an anchor which may be sold attached to the various tubes by the manufacturers, or sold separately.

For a full understanding of the invention, a detailed description of the preferred embodiment of the tube anchor and guide device will now be given in conjunction with the accompanying drawings:

FIGURE 1 is a plan view of a tube anchor and guide device embodying the principles of this invention, especially adapted for use with naso-gastric tubes;

FIGURE 2 is a side elevation of the device of FIGURE 1, showing the device in use as a channel guide;

FIGURE 3 is a view similar to FIGURE 2, but with the device locked upon the tube to serve as an anchor;

FIGURE 4 is a view similar to FIGURE 3, illustrating an alternative grommeted construction;

FIGURE 5 is a plan view of an alternative utility construction;

FIGURE 6 is a side illustration of the central portion of the alternative construction in use as a channel guide; and FIGURE 7 is the portion shown in FIGURE 6, but with the device locked upon the tube to serve as an anchor.

The naso-gastric version of FIGURE 1 and the utility version of FIGURE 5 are essentially the same, and are modified by shape and function only; however, reference hereafter will be made to each separately to facilitate clarity.

Primarily, the illustrated preferred embodiments of this invention comprise a single unit of thick gauge plastic tape construction, having adhesive and non-adhesive areas. The central non-adhesive area contains folding sections with holes therein to accommodate the various tubes.

Referring to FIGURE 1, a central non-adhesive area 10 is shown with five folding sections 12–16, in which sections 12, 13, 15, and 16 contain holes 17. Holes 17 are of a suitable size to allow freedom of the tube, when the central section is folded to the channeled position as seen in FIGURE 2. In some instances the holes are placed to overlap, and thus become slots when the central area is folded. A tube may thus be inserted or removed from the slot as desired.

Referring again to FIGURE 1, reference numbers 20 and 21 refer to one-sided adhesive areas which are backed by a protective, removable material 22. Area 20 represents that portion which will be folded over and adhered to the nose of a patient. Area 21 represents that portion which will adhere to the forehead. The extension position of the central area, (channeled or secured) will be dictated by the therapy employed.

Holes 17 will usually be provided by merely removing material from the plastic tape. However, for special duty purposes, it is contemplated that grommets 24, as seen in FIGURE 4, may be employed. Grommets 24 will be particularly useful if a softer material than thick gauge plastic is to be used as the base material.

Referring now to FIGURE 5, the reference number 26 refers to the central folding sections with larger holes 27 for larger tubes. Reference 28 indicates adhesive end areas which will adhere to any desired surface, e.g., patient's skin, bed frame, linen or wall. The positioning of the central area is adapted according to the therapy.

Medical tubing

The main body of medical tubing referred to here, consists of those tubes employed during general hospital, surgical and post-surgical procedures.

Since these tubes convey some material to or from the patient, it is necessary to anchor them in some manner enroute. Such anchoring is needed in order to relieve the drag of the tubing upon the patient, and to insure maximum tube function by proper positioning.

The commonly used tubal procedures remain a constant annoyance to the patient as well as the hospital staff. Not the least of these problems is the present method of anchoring these tubes.

The prior art methods of anchoring medical tubing are:

(1) Taping the tube to the patient's skin.
(2) Taping the tube to the bed frame.
(3) Taping or safety-pinning the tube to the bed linen.

While this taping procedure is commonly used, it has the primary disadvantage of making the tube secure at each anchoring point. This procedure does not allow for a channeling of the tube. The importance of this feature in the present invention will follow.

Neatness and general appearance

Due to the natural resistance of the tubing to be anchored, (especially plastic tubing) present practices require large amounts of irregularly cut pieces of adhesive tape applied in an indiscriminate manner. The result creates a messy, unprofessional appearance. This is especially seen when anchoring a naso-gastric tube about the nose and forehead. Indeed, slashes of tape applied elsewhere along the route of the tubes are equally messy in appearance.

The device of this invention, however, is a neat, compact, professional appearing adhesive device, designed to alleviate the unitidy, excessive taping procedure now practiced.

Because the resistance of the tubes to anchoring is distributed in the central portion of the device, and not upon the adhesive areas directly, a minimum amount of material is used. Uniformity is also a feature of this invention.

Concerning economy

Although ordinary adhesive tape is rather inexpensive, its use in anchoring rubber or latex tubing can be costly in hospital manhours. Since the adhesive sticks to the rubber or latex tubing, much time is spent in soaking and cleaning the tubes prior to the necessary autoclaving. The sometimes used method of safety-pinning the tubes to the bed linen often results in torn linen.

The device of this invention will cost little more than ordinary adhesive tape, but with more and distinct advantages. With this invention, no part of the adhesive area comes in contact with the tubing. This will eliminate the time consuming process of cleaning off the residual adhesive before autoclaving. It also eliminates the excessive amounts of adhesive tape now necessary to anchor the various tubes.

Concerning safety and comfort

The main reason for anchoring medical tubing is to relieve the drag of the tubes upon the patient. Since there is no method prior to this invention to allow for channeling of these tubes, leaving them free to movement, injuries can result from sudden movements, or the patient leaving the bed under drug induced delusions.

Precaution for this potential injurious condition prior to this invention was a slack in the tubing, necessitating undue amounts of tubing about the patient and bedding. Further disadvantage occurs when the patient inadvertently rolls over upon the tubing, decreasing or eliminating the tube function.

Conversely, when the present invention is set in the channeled position, as shown in FIGURES 2 and 6, and adhered to any desired surface, the tube will be anchored, but free to move, thus eliminating the possibility of injuries occurring during changes of the patient's position. Tubal function is also assured with the elimination of slack in the tubing, such slack has heretofore been a necessity. Added comfort to the patient is achieved through the use of this invention by the minimum amount of adhesive used in the units.

Function of this invention with specific tubes

Levin tubes are employed to remove gas and fluid from the gastric region, usually following abdominal surgery. Alternate therapies include liquid feedings and medicating via the tubing.

Some time prior to use, the tube is threaded through the four holes of the device as shown in FIGURE 1, and the device is positioned at the outer end of the tubing. After the tube is inserted to the desired level, it becomes necessary to anchor the tube, usually to the nose and forehead. The protective coverings 22 of the adhesive portions of the device are then removed, and portion 20 is adhered over the bridge of the nose, portion 21 is then fixed to the forehead.

Because it is desired that the tube remain at the precise level internally, the central area of the device will be set in the secured position of FIGURE 3, making the tube fast. After this point of anchoring, the tube continues on the connect with the suction machine on the floor nearby. It becomes advantageous to again anchor the tube enroute. This is best accomplished by use of the utility version of the device set in the channeled position of FIGURE 6, and adhered to the bed frame or mattress. Since the tube at this point of anchoring is not made fast, necessary movements of the patient is possible with safety, also eliminating current un-taping and re-taping procedures when moving the patient.

Miller-Abbott tubes, catheters, drainage tubes, and oxygen supply tubes, each of which has its distinct function, are anchored or guided, as the medical need dictates.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the invention as hereinafter claimed.

What is claimed is:

1. An anchoring device for medical tubing, comprising:
   a strip of material having a top and bottom surface and at least two adjacent panel sections hinged together by a lateral hinge area, each panel section having a portion thereof removed to define a tube receiving passage therethrough, said panel sections being erectable to align the respective passages thereof to jointly define a tube guide means;
   said bottom surface of said panel sections closable about said hinge to bring adjacent panel sections together in a substantially erect position wherein said removed portions define a maximum passage area, and extendable to any one of a plurality of extension positions, each successive extension position relating said panel sections in a larger angular relationship, whereby said passage area is selectively decreased, and
   means for securing a portion of said bottom surface of said strip to a support surface in any of said positions, whereby said anchoring device is securable to a support surface adjacent the patient, or to his person.

2. An anchoring device for medical tubing, comprising:
   a strip of material having a top and bottom surface and at least two adjacent panel sections hinged together by a lateral hinge area, each panel section having a through opening, said panel sections being erectable to align the respective openings thereof to jointly define a tube guide means;
   said bottom surface of said panel sections closable about said hinge to bring adjacent panel sections together in a substantially erect position wherein said removed portions define a maximum passage area, and extendable to any one of a plurality of extension positions, each successive extension position relating said panel sections in a larger angular relationship, whereby said passage area is selectively decreased, at least one said section having an anchoring tab, said anchoring tab attached on the side of said section opposite the hinged connection; and
   adhesive means on the bottom surface of said anchoring tab for securing said tab.

3. In the anchoring device defined in claim 2, said sections presenting two extreme ends, and an anchor tab attached to each of said extreme ends for securing said central sections in a pre-selected degree of angular relationship.

4. An anchoring device for tubing, comprising:
   a strip of material having a central series of at least two adjacent sections hinged together and erectable as a guide means, each said section having a through opening, and an anchor tab at opposite ends of said series;

adhesive means to secure said anchor tabs to a support surface;

said anchor tabs having a lateral dimension beyond the longitudinal limits of said sections to thereby provide greater anchor surface conformability to patient body configuration;

said openings forming aligned surfaces in said erected position of said sections as a means to hold tubing extending therethrough in a selected position.

5. An anchoring device for tubing, comprising:

a strip of material having a central series of at least two adjacent sections hinged together and erectable as a guide means, each said section having a through opening, and an anchor tab at opposite ends of said series;

said openings forming aligned surfaces in an erected position of said sections as a means to hold tubing extending therethrough in a selected position; and said sections having a first position in close relationship wherein the vertical extent of the whole is greater than the diameter of the tubing to be supported and the tube is therefore free to slide relative to said anchoring device, and having a second position of greater angular relationship wherein the said vertical extent of the openings is less than the tube diameter and thereby is pinched and held fast against longitudinal movement.

References Cited

UNITED STATES PATENTS

| | | | |
|---|---|---|---|
| 2,351,927 | 6/1944 | Contini | 174—29 |
| 3,002,630 | 10/1961 | Heisser | 211—65 |
| 3,046,989 | 7/1962 | Hill | 128—346 X |
| 3,138,158 | 6/1964 | Gordon et al. | 128—348 X |
| 3,142,778 | 9/1964 | Krawiec | 128—349 |
| 3,162,920 | 12/1964 | Durham | 24—67.1 |
| 3,172,407 | 3/1965 | Von Pechmann | 128—206 |
| 3,210,816 | 10/1965 | Clemons. | |
| 3,288,136 | 11/1966 | Lund | 128—348 X |

DALTON L. TRULUCK, *Primary Examiner.*